W. B. JOHNSON.
CENTERING MACHINE.
APPLICATION FILED APR. 3, 1908.
959,865.
Patented May 31, 1910.
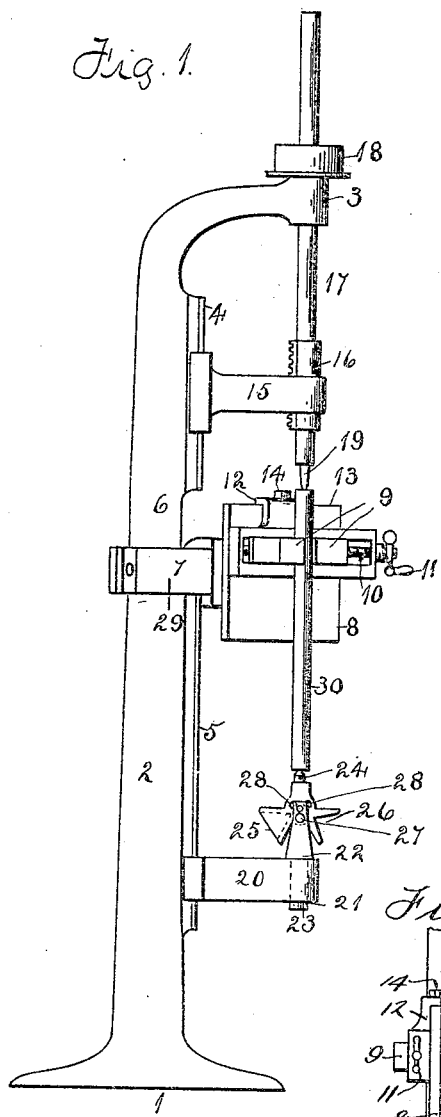
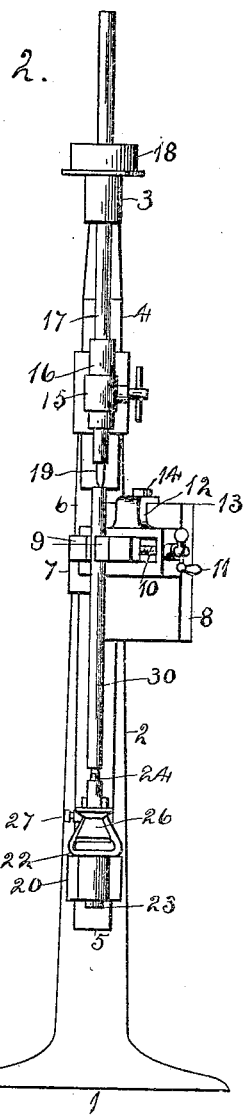
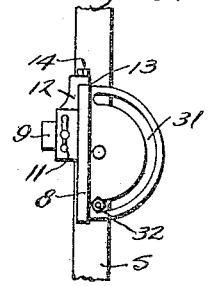
Witnesses:
G. Ward.
E. Behel.
Inventor:
William B. Johnson
By A. O. Behel
Atty.

UNITED STATES PATENT OFFICE.

WILLIAM B. JOHNSON, OF ROCKFORD, ILLINOIS, ASSIGNOR TO ROCKFORD LATHE & DRILL COMPANY, OF ROCKFORD, ILLINOIS, A CORPORATION OF ILLINOIS.

CENTERING-MACHINE.

959,865. Specification of Letters Patent. Patented May 31, 1910.

Application filed April 3, 1908. Serial No. 424,911.

*To all whom it may concern:*

Be it known that I, WILLIAM B. JOHNSON, a citizen of the United States, residing at Rockford, in the county of Winnebago and State of Illinois, have invented certain new and useful Improvements in Centering-Machines, of which the following is a specification.

The object of this invention is to construct a machine for centering the ends of shafts, and holding the shafts in a vertical position while being centered.

In the accompanying drawings Figure 1 is a side elevation of my improved centering machine. Fig. 2 is a front elevation. Fig. 3 shows the pivotal connection of the table.

The main frame comprises the base 1, vertical column 2 and overhanging head 3. The column has two vertically arranged guide-ways 4 and 5 between which the section of the column 6 is rounded. The rounded section 6 of the column supports a collar 7 to which is pivoted a table 8 which is capable of being adjusted into a vertical position through the medium of the slot 31 and the adjusting bolt 32, as shown at Fig. 3 in the drawings. To this table is secured a universal vise comprising the two jaws 9 which are adjusted toward and from one another by the right and left handed screw 10 which is turned by the crank 11. This vise is secured to the table by the upper overhanging portion 12 engaging the edge 13 of the table and the screw 14 clamping it to the table.

The guide-way 4 supports an arm 15, the free end of which supports a sleeve 16, through which a drill spindle 17 passes. This drill spindle is also supported by the head 3, and a pulley 18 supported by the head, has a driving connection with the drill spindle 17. This arm 15 is adjusted along the guide-way 4 to bring the tool 19 supported by the drill-spindle in proper relation with the table.

The guide-way 5 supports a bracket 20, the free end of which has a vertical hole 21. The bracket 20 supports a rest for the lower end of a shaft. This rest comprises a base 22 having a rounded section 23 fitted to enter the hole 21 in the bracket 20. The upper end of this base is in fork form, between the branches of which is pivoted a spider arm comprising the pointed section 24, the cup section 25 and the forked section 26. Any one of these sections can be held in a vertical position by turning the spider and inserting the pin 27 in one of the holes 28 in the spider.

The collar 7 supporting the table 8 is turned to bring the center of the vise beneath the center of the tool, which is indicated by the marks 29 on the column, and collar.

If the shaft 30 to be centered has one end already centered, the centered end is placed on the point 24 of the rest. The shaft is then clamped in the vise which will hold the shaft in perfect alinement with its rest, and the tool 19. The tool 19 is then lowered onto the upper end of the shaft and set in rotation which will drill a center in the shaft. If the shaft does not have a centered lower end, the cup 25 of the spider is brought into a vertical position, into which the lower end of the shaft is placed, and which, owing to its cone-shape will support the shaft centrally beneath the vise.

The vertical adjustment of the arm 15 and bracket 20, will receive shafts of various lengths.

This construction forms a very simple, cheap and efficient centering device.

The fork 26 of the spider is intended when turned into a vertical position to receive a section of shafting which has its end beveled.

I claim as my invention.

A centering machine comprising a vertically arranged column, a vertically arranged drill-spindle, a table capable of adjustment into a vertical position, and a universal vise secured to the table in alinement with the drill-spindle.

In testimony whereof I have hereunto set my hand in presence of two subscribing witnesses.

WILLIAM B. JOHNSON.

Witnesses:
A. O. BEHEL,
E. D. E. N. BEHEL.